(12) United States Patent
Hirai

(10) Patent No.: US 7,840,243 B2
(45) Date of Patent: Nov. 23, 2010

(54) ANTENNA ARRANGEMENT IN A MOBILE TERMINAL APPARATUS

(75) Inventor: Masayoshi Hirai, Yokohama (JP)

(73) Assignee: Panasonic Corporation, Osaka (JP)

( * ) Notice: Subject to any disclaimer, the term of this patent is extended or adjusted under 35 U.S.C. 154(b) by 541 days.

(21) Appl. No.: 11/814,482

(22) PCT Filed: Jan. 26, 2006

(86) PCT No.: PCT/JP2006/300877

§ 371 (c)(1),
(2), (4) Date: Jul. 20, 2007

(87) PCT Pub. No.: WO2006/077983

PCT Pub. Date: Jul. 27, 2006

(65) Prior Publication Data

US 2009/0131125 A1 May 21, 2009

(30) Foreign Application Priority Data

Jan. 21, 2005 (JP) .................. P.2005-014113

(51) Int. Cl.
*H04M 1/00* (2006.01)
*H04M 9/00* (2006.01)

(52) U.S. Cl. .............. 455/575.7; 455/575.1; 455/575.3; 379/428.01

(58) Field of Classification Search .............. 455/550.1, 455/575.1, 575.3, 575.5, 575.7; 379/428.01
See application file for complete search history.

(56) References Cited

U.S. PATENT DOCUMENTS

| | | | | |
|---|---|---|---|---|
| 5,451,965 A | * | 9/1995 | Matsumoto | .................. 343/702 |
| 7,526,083 B2 | * | 4/2009 | Kim et al. | .............. 379/433.13 |
| 2001/0034242 A1 | * | 10/2001 | Takagi | ......................... 455/550 |
| 2001/0051510 A1 | * | 12/2001 | Nakamura | ................... 455/90 |
| 2002/0173281 A1 | * | 11/2002 | Kobayashi | ................... 455/90 |
| 2004/0106428 A1 | * | 6/2004 | Shoji | ....................... 455/550.1 |
| 2004/0198417 A1 | * | 10/2004 | Yoda | ....................... 455/550.1 |
| 2006/0019696 A1 | * | 1/2006 | Brunel et al. | ............ 455/550.1 |

(Continued)

FOREIGN PATENT DOCUMENTS

JP 05-259656 A 10/1993

(Continued)

*Primary Examiner*—Andrew Wendell
(74) *Attorney, Agent, or Firm*—Seed IP Law Group PLLC

(57) ABSTRACT

There is provided a mobile terminal apparatus in which downsizing of the mobile terminal apparatus can be achieved and an antenna characteristic can be suitably supplied.

In a mobile terminal apparatus 10, upper and lower housing 13 and 15 are coupled with each other by a coupling part 18 so as to be openable and closable, upper and lower circuit boards 21 and 24 are provided in the upper and lower housing 13 and 15, upper and lower protective cover parts 31 and 32 cover the upper and lower housing; and a flexible part 33 couples the upper and lower protective cover parts so as to be openable and closable and covers the coupling part. In the mobile terminal apparatus 10, an antenna power feeding land 51 is provided in one of the upper and lower circuit boards, a power feeding terminal of the antenna part 40 is electrically connected to this one circuit board via the antenna power feeding land, and the antenna part is housed in the flexible part.

6 Claims, 7 Drawing Sheets

U.S. PATENT DOCUMENTS

2007/0173301 A1* 7/2007 Kang .................. 455/575.3
2009/0131129 A1* 5/2009 Yamazaki et al. ........ 455/575.7

FOREIGN PATENT DOCUMENTS

| | | |
|---|---|---|
| JP | 07-038461 A | 2/1995 |
| JP | 07-203523 A | 8/1995 |
| JP | 09-130118 A | 5/1997 |
| JP | 10-224439 A | 8/1998 |
| JP | 11-041330 A | 2/1999 |
| JP | 11-331017 A | 11/1999 |
| JP | 2000-124732 A | 4/2000 |
| JP | 2001-045123 A | 2/2001 |
| JP | 2005-333202 A | 12/2005 |
| JP | 2005-354552 A | 12/2005 |
| WO | 02/054532 A1 | 7/2002 |
| WO | WO 02/03665 * | 10/2002 |

* cited by examiner

ANTENNA ARRANGEMENT IN A MOBILE TERMINAL APPARATUS

TECHNICAL FIELD

The present invention relates to a mobile terminal apparatus having a first housing and a second housing coupled with each other by a coupling part so as to be openable and closable, circuit boards provided in the first and second housing, and protective covers protecting the members.

BACKGROUND ART

In recent years, various types of mobile terminal apparatuses such as cellular phones have been developed and used. In addition to straight-type mobile terminal apparatuses having a stick shape, folding-type mobile terminal apparatuses openable and closable by a hinge part have been variously developed as the mobile terminal apparatuses.

The folding-type mobile terminal apparatuses have an upper housing having a display part, a lower housing having an operation part, and a hinge part openably and closably coupling the upper housing and the lower housing so that the display part and the operation part face each other. The folding-type mobile terminal apparatus has a structure in which the upper housing and the lower housing rotate relative to each other on an axis of the hinge part to be folded.

Accordingly, the hinge part has a substantially cylindrical shape and has an outer diameter larger than a thickness of the upper housing or a thickness of the lower housing having the display part or the display part, in general.

Thus, the hinge part protrudes from an upper surface of the upper and lower housing (for example, see Patent Document 1).

For this folding-type mobile terminal apparatus, a case that a user who has long nails operates the operation part, tips of the nails would interfere with the protruding hinge part, and it might be difficult to operate the operation part well.

Consequently, providing a desirable distance between the operation part and the hinge part is considered to be one option to allow the user with long nails to easily operate the operation part.

However, when such a desirable distance is provided between the operation part and the hinge part, total housing length from the upper housing to the lower housing also increases to cause an increase in size of the apparatus.

Further, since an extendable antenna should be mounted in one of the upper and lower housings, it is also one factor to suppress downsizing of the folding-type mobile terminals.

A characteristic of the antenna is suitably supplied by making the antenna extendable.

Therefore, for example, there is proposed a folding-type mobile terminal apparatus in which a coupling part coupling the upper housing having the display part and the lower housing having the operation part is formed in a shape of a foldable strip thinner than the upper or lower housing (for example, see Patent Document 2).

However, even in the folding-type mobile terminal apparatuses disclosed in Patent Document 2, as the antenna is mounted in one of the upper housing and the lower housing, that is one reason to suppress downsizing of the folding-type mobile terminal apparatus.

To solve the problem, there is known a folding-type mobile terminal apparatus 100 shown in FIGS. 8(a) and 8(b).

In the folding-type mobile terminal apparatus 100, a first housing 101 having the display part is coupled with a second housing 102 having the operation part by a coupling part 103, a first board 104 is provided in the first housing 101, a second board 105 is provided in the second housing 102, an antenna part 106 is mounted within the coupling part 103, and the first housing 101, the second housing 102, and the coupling part 103 are covered with a protective cover 108.

The antenna part 106 is built in the coupling part 103, whereby downsizing of the folding-type mobile terminal apparatus 100 can be achieved.

Patent Document 1: Japanese Patent Publication No. JP 2001-45123A

Patent Document 2: Japanese Patent Publication No. JP 5-259656A

DISCLOSURE OF THE INVENTION

Problem that the Invention is to Solve

However, when the antenna part 106 is mounted within the coupling part 103, the antenna part 106 is too close to the first board 104 and the second board 105. As a result, the first board 104 and the second board 105 becomes resistance factors to a radio wave emitted from the antenna part 106, whereby it is difficult to supply good performance of an antenna.

The present invention is made in view of the situation. An object of the invention is to provide a mobile terminal in which downsizing of a folding-type mobile terminal apparatus can be achieved and a characteristic of the antenna can be suitably supplied.

Means for Solving the Problem

A mobile terminal apparatus according to the invention includes first and second housing coupled with each other by a coupling part so as to be openable and closable; first and second circuit boards provided in the first and second housing; first and second protective cover parts covering the first and second housing; and a flexible part coupling the first and second protective cover parts so as to be openable and closable and covering the coupling part, wherein, an antenna power feeding land is provided in any one of the first and second circuit boards, a leading edge of the antenna part is electrically connected to the one circuit board via the antenna power feeding land, and the antenna part is housed in the flexible part.

Since it is not necessary to provide the antenna part in any one of the first and second housing by housing the antenna part in the flexible part, it is possible to achieve downsizing of the mobile terminal apparatus.

Moreover, the antenna part is disposed at a position far away from the joint sheet metal or the first and second circuit boards at the time of opening the protective cover by housing the antenna part in the flexible part, whereby it is possible to dispose the antenna part apart from a ground of the joint sheet metal or grounds of the first and second circuit boards.

Accordingly, resistance factors to radio wave emitted from the antenna part can be kept away so that it is possible to supply high antenna performance.

In the mobile terminal apparatus according to the invention, an end edge of the antenna part is disposed on a top portion of the flexible part.

The end edge of the antenna part is disposed on the top portion of the flexible part, whereby it becomes possible to dispose the end edge of the antenna part apart from the grounds of the first and second circuit boards.

Accordingly, the resistance factors to the radio wave emitted from the antenna part are kept away so that it is possible to supply the high antenna performance.

In the mobile terminal apparatus according to the invention, a magnet is provided on a surface opposite to the antenna power feeding land. A leading edge of the antenna part is contact with the antenna power feeding land by attracting the leading edge of the antenna part with the magnet, in one of the circuit boards.

It is possible to position the antenna part in the antenna power feeding land by attracting the leading edge of the antenna part with the magnet.

Accordingly, even though the antenna power feeding land of any one of the first and second circuit boards is deviated from the start end of the antenna part at the time of removing the protective cover 12, the deviation is corrected by the magnetic force, whereby it is possible to perform stable power feeding.

In the mobile terminal apparatus according to the invention, a joint sheet metal electrically connecting the first and second circuit boards is disposed in a center of the coupling part.

Here, the antenna part is housed in the flexible part, whereby it is not necessary to provide the antenna part in the coupling part. Therefore, it becomes possible to dispose the joint sheet metal in the center of the coupling part.

The joint sheet metal is elastically deformed substantially in a U shape when the first and second housing are closed. A force for opening the first and second housing acts by a resilient force of the elastically deformed joint sheet metal.

When the joint sheet metal is deviated from the center of the coupling part, the resilient force of the joint sheet metal 26 acts only on one side of the first and second housing at the time of closing the first and second housing, whereby a torsion force occurs in the first and second housing.

As the result, when the first and second housing are opened, one side of the upper and lower housing is opened earlier, that is, a one-side opening phenomenon occurs.

The joint sheet metal is disposed in the center of the coupling part. Accordingly, when the first and second housing are closed, the resilient force of the joint sheet metal acts on the center of the first and second housing.

Therefore, since the first and second housing can be evenly opened so that the one-side opening phenomenon does not occur at the time of opening the first and second housing, it is possible to improve ease of use.

Advantage of the Invention

As described above, according to the invention, an antenna part is housed in a flexible part, whereby downsizing of a mobile terminal apparatus can be achieved and resistance factors to the radio wave emitted from the antenna part are kept away, and it is possible to supply high performance of an antenna suitably.

DESCRIPTION OF REFERENCE NUMERALS AND SIGNS

Figure 1:
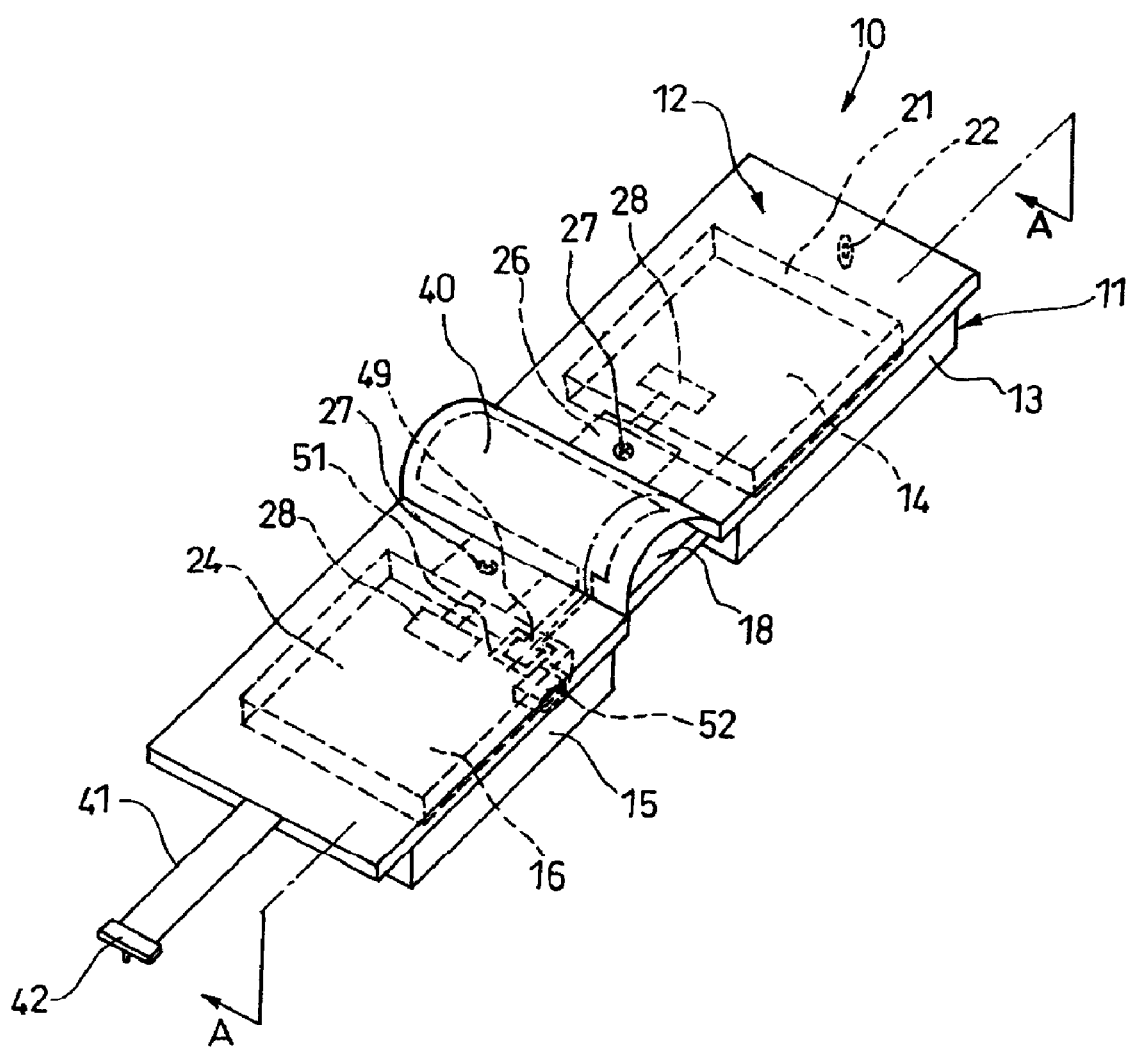
FIG. 1 is a perspective view illustrating a state in which a mobile terminal apparatus (a first embodiment) is opened according to an embodiment of the invention.

10: mobile terminal apparatus
13: upper housing
15: lower housing
18: coupling part
21: upper circuit board (first circuit board)
24: lower circuit board (second circuit board)
24$a$: back surface of antenna power feeding land
31: upper protective cover part (first protective cover part)
32: lower protective cover part (second protective cover part)
33: flexible part
38: front-side shield (low dielectricity member)
39: back-side shield (low dielectricity member)
40, 61: antenna part
45$a$: end edge of antenna part
49: power feeding terminal (leading edge)
51: antenna power feeding land
52: magnet

BEST MODE FOR CARRYING OUT THE INVENTION

Hereinafter, embodiments of the invention will specifically be described with reference to the accompanying drawings.

Figure 2:
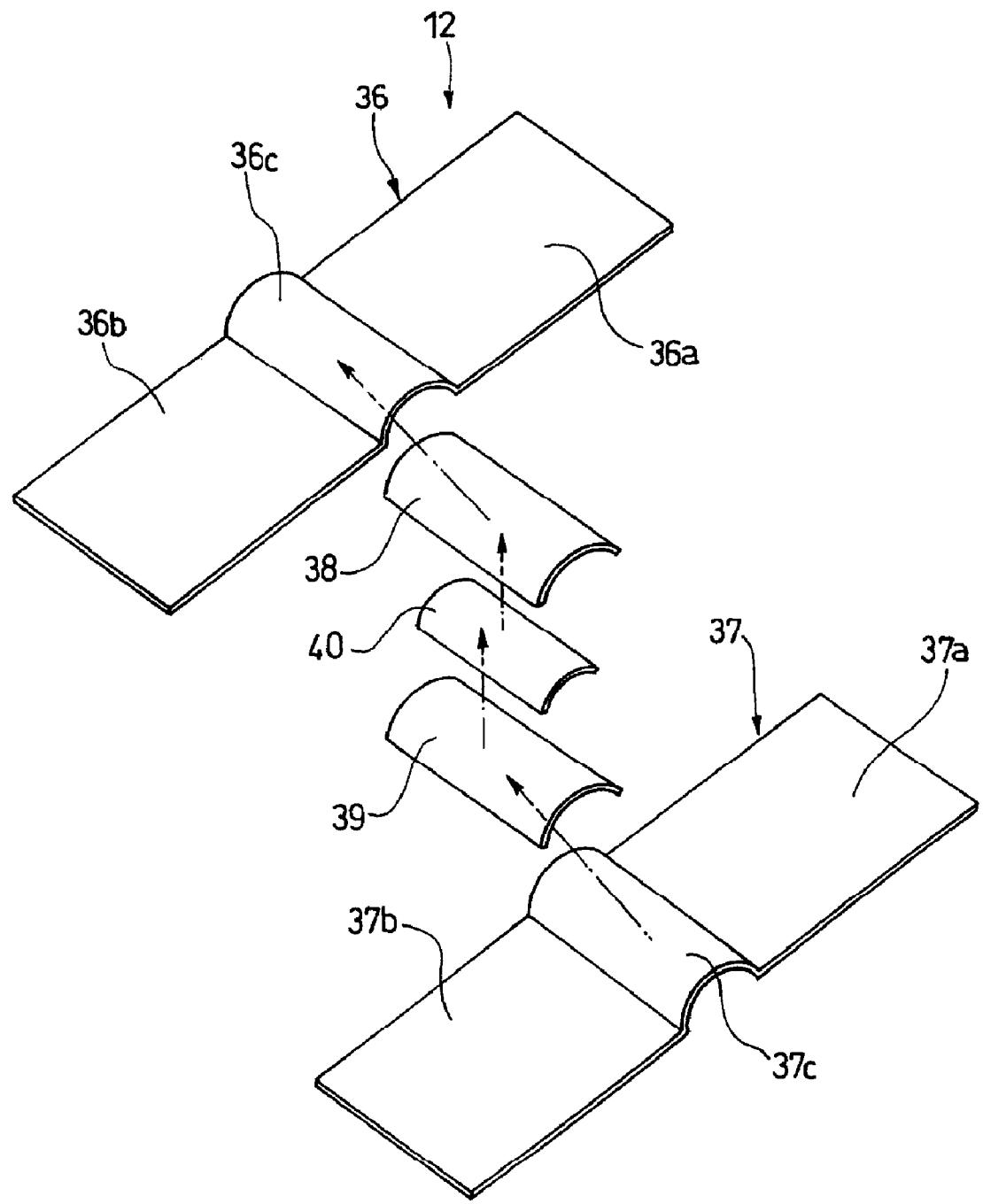
FIG. 2 is an exploded perspective view illustrating a state in which a protective cover is opened according to the first embodiment of the invention.
Figure 3:
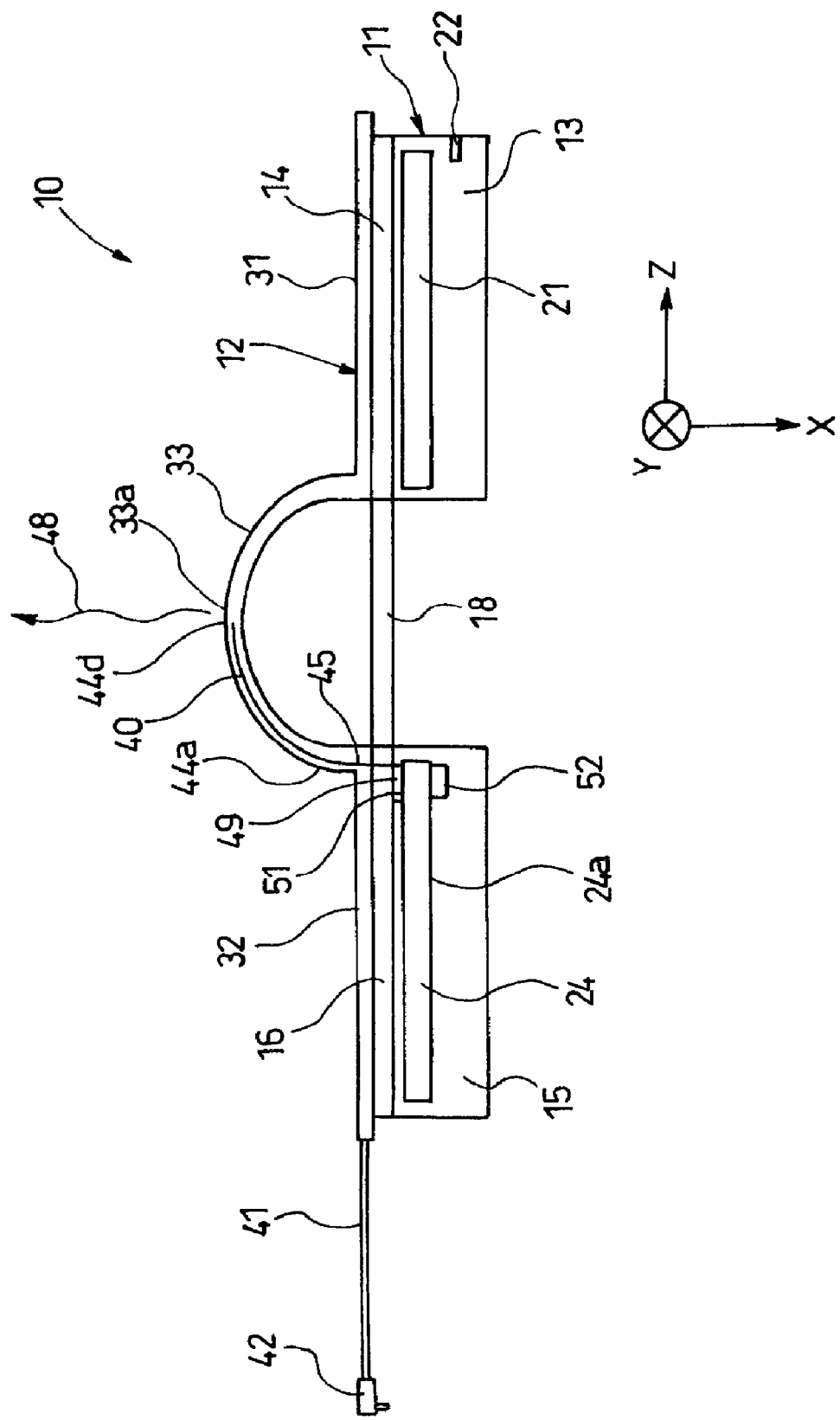
FIG. 3 is a sectional view taken along line A-A shown in FIG. 1.

A mobile terminal 10 according to a first embodiment of the invention shown in FIGS. 1 to 3 includes a mobile terminal apparatus body 11 such as a folding-type cellular phone as an example of the mobile terminal apparatus 10 and a protective cover 12 protecting the mobile terminal apparatus body 11.

In the mobile terminal apparatus body 11, an upper housing (a first housing) 13 is attached to an upper housing case 14, a lower housing (a second housing) 15 is attached to a lower housing case 16, the upper and lower housing cases 14 ad 16 are coupled with each other by a coupling part 18, the upper housing 13 is provided with an upper circuit board (a first circuit board) 21 and an upper fixing member 22, and the lower housing 15 is provided with a lower circuit board (a second circuit board) 24.

The coupling part 18 is formed of a flexible member and the upper and lower housing 13 and 15 are coupled with each other so as to be openable and closable.

A joint sheet metal 26 is provided in a center in a width direction (a center) of the coupling part 18 and opposite end portions of the joint sheet metal 26 are coupled with the upper and lower housing cases 14 and 16 by screws 27.

The opposite end portions of the joint sheet metal 26 are earthed onto corresponding grounds (connection elements) 28, so that the upper and lower circuit boards 21 and 24 are electrically connected to each other.

The upper housing 13 houses a receiving part (a receiver), a speaker, or a display part in addition to the upper circuit board 21.

The upper circuit board 21 houses an LCD constituting the display part etc.

The lower housing 15 houses a transmitting part (a microphone), an operation part, a vibrator part, a camera part, and a battery etc. in addition to the lower circuit board 24.

A transceiver part, a data converting part, a voice processing part, an image processing part, an information recording part, and a control part etc. are mounted on the lower circuit board 24.

In the protective cover 12 shown in FIG. 3, the upper housing case (the upper housing) 14 is covered with an upper protective cover part (a first protective cover part) 31, the lower housing case (the lower housing) 16 is covered with a lower protective cover part (the second protective cover part) 32, the upper and lower protective cover parts 31 and 32 are coupled with each other by a flexible part (that is, a surplus part) 33, and the coupling part 18 is covered with the flexible part 33. The protective cover 12 is removably mounted on the mobile terminal apparatus body 11.

As shown in FIG. 2, the protective cover 12 includes a front-side protective cover part 36 and a back-side protective cover part 37. The front-side protective cover part 36 includes a front-side upper cover portion 36a, a front-side lower cover portion 36b, and a front-side bending portion 36c.

A back-side protective cover part 37 includes a back-side upper cover portion 37a, a back-side lower cover portion 37b, and a back-side bending portion 37c.

In the protective cover 12, the front-side upper cover portion 36a and the back-side upper cover portion 37a are laminated, the front-side lower cover portion 36b and the back-side lower cover portion 37b are laminated. As shown in FIG. 2, a front-side shield (a substance having low dielectricity) 38, an antenna part 40, and a back-side shield (a substance having low dielectricity) 39 are interposed and laminated between the front-side bending portion 36c and the back-side bending portion 37c as indicated by arrows.

In the protective cover 12, a strap 41 (see FIGS. 1 and 3) is extended from in a portion in which the front-side lower cover portion 36b and the back-side lower cover portion 37b and a front end portion of the strap 41 is provided with the lower fixing member 42.

When the mobile terminal apparatus 10 is closed, that is, when the upper and lower housing 13 and 15 are closed, the lower fixing member 42 engages with the upper fixing member 22 of the upper housing 13, thereby holding the upper and lower housing 13 and 15 to be closed.

In the flexible part 33 (see FIG. 3), the front-side shield 38, the antenna part 40, and the back-side shield 39 are interposed and laminated between the front-side bending portion 36c and the back-side bending portion 37c.

The flexible part 33 is a flexible portion of curved shape so as to protrude to a front side. The front-side shield 38 and the back-side shield 39 are members such as paper having low dielectricity.

The antenna part 40 is housed in the flexible part 33 of the protective cover 12 and is interposed between the front-side and back-side shields 38 and 39 having low dielectricity.

The antenna part 40 is interposed between the front-side and back-side shields 38 and 39 having low dielectricity, whereby the antenna part 40 is electrically protected by the front-side and back-side shields 38 and 39.

Accordingly, a dielectric loss caused by the protective cover 12 can be reduced, whereby it is possible to supply high antenna performance.

Here, a case in which the antenna part 40 is interposed between the front-side and back-side shields 38 and 39 having low dielectricity, whereby it is possible to supply the high antenna performance is described in detail.

An X-Z plane PAG (dBd) is measured at frequencies of 810 MHz and 960 MHz as a measurement condition.

The measured X-Z plane PAG represents an X-Z plane directional pattern gain.

The PAG is an abbreviation of Pattern Average Gain.

dBd represents the unit of a value on the basis of a half-wave dipole antenna (Antenna gain with an emission pattern of the half-wave dipole antenna=0 (dBd)).

Hereinafter, when the front-side and back-side shields 38 and 39 are not provided, it is described that "without shield" and when the front-side and back-side shields 38 and 39 are provided, it is described that "with shield".

First, the frequency of 810 MHz is described.

A measurement value of the X-Z plane PAG plane when the mobile terminal apparatus 10 is opened, that is, when the upper and lower housing 13 and 15 are opened is as follows.

A measurement value of X-Z plane PAG of "without shield" is −4.9 (dBd).

A measurement value of the X-Z plane PAG is −4.9 (dBd).

A difference between the measurement values of the X-Z plane PAG when "without shield" and when "with shield" is 0 (dBd) and the both measurement values have little difference.

A measurement value of the X-Z plane PAG when the mobile terminal apparatus 10 is closed, that is, the upper and lower housing 13 and 15 are closed is as follows.

When "without shield", the measurement value of the X-Z plane PAG is −9.3 (dBd).

When "with shield", the measurement value of the X-Z plane PAG is −9.0 (dBd).

A difference between the measurement values of the X-Z plane PAG when "without shield" and when "with shield" is +0.3 (dBd) and an antenna characteristic when "with shield" is superior to that when "without shield".

Next, the frequency of 960 MHz will be described.

A measurement value of the X-Z plane PAG when the upper and lower housing 13 and 15 are opened is as follows.

When "without shield", the measurement value of the X-Z plane PAG is −6.1 (dBd).

When "with shield", the measurement value of the X-Z plane PAG is −6.2 (dBd).

A difference between the measurement values of the X-Z plane PAG when "without shield" and when "with shield" is −0.1 (dBd) and the measurement values of the X-Z PAG have little difference.

A measurement value of the X-Z plane PAG when the upper and lower housing 13 and 15 are closed is as follows.

When "without shield", the measurement value of the X-Z plane PAG is −12.4 (dBd).

When "with shield", the measurement value of the X-Z plane PAG is −12.0 (dBd).

A difference between the measurement values of the X-Z plane PAG when "without shield" and when "with shield" is +0.4 (dBd) and an antenna characteristic when "with shield" is superior to that when "without shield".

In view of the above, when "with shield" and when the upper and lower housing 13 and 15 are closed, the antenna characteristic is superior.

Figure 6:
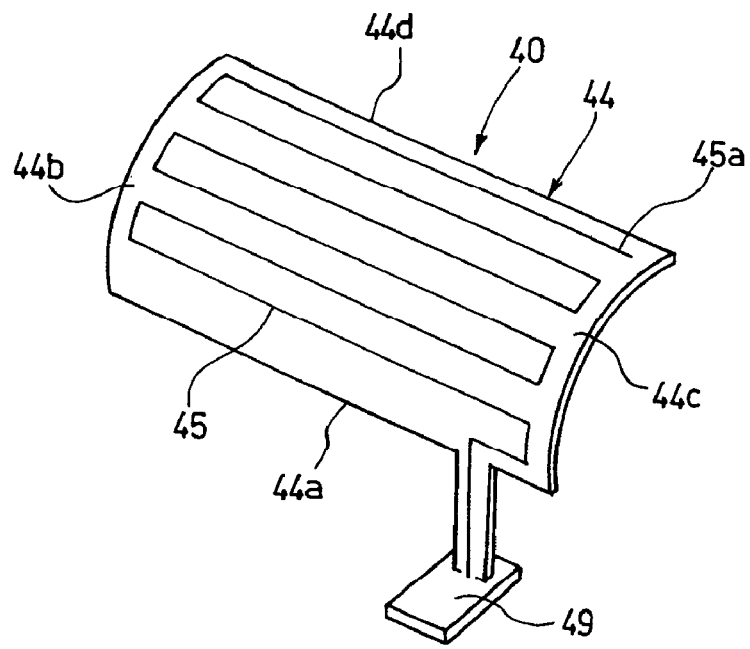
FIG. 6 is a perspective view illustrating an antenna part of the mobile terminal apparatus according to the first embodiment.

As shown in FIG. 6, in the antenna part 40, a rectangular flexible plate 44 has a curved shape, a conductor 45 extends from a lower end portion 44a of the plate 44 along a length direction, both end portions 44b and 44c of the plate 44 are folded in a bellows shape toward an upper end portion 44d, whereby an end edge (an end edge of the antenna part) 45a of the conductor 45 is disposed on the upper end portion 44d of the plate 44.

The end edge 45a of the conductor 45 is disposed on the upper end portion 44d of the plate 44, whereby a radio wave is transmitted from the upper end portion 44d of the plate 44.

However, as described above, the antenna part 40 is housed in the flexible part 33, whereby it is not necessary to provide the antenna part 40 in the coupling part 18. Accordingly, as shown in FIG. 1, it becomes possible to dispose the joint sheet metal 26 in a center of the coupling part 18.

Figure 4:
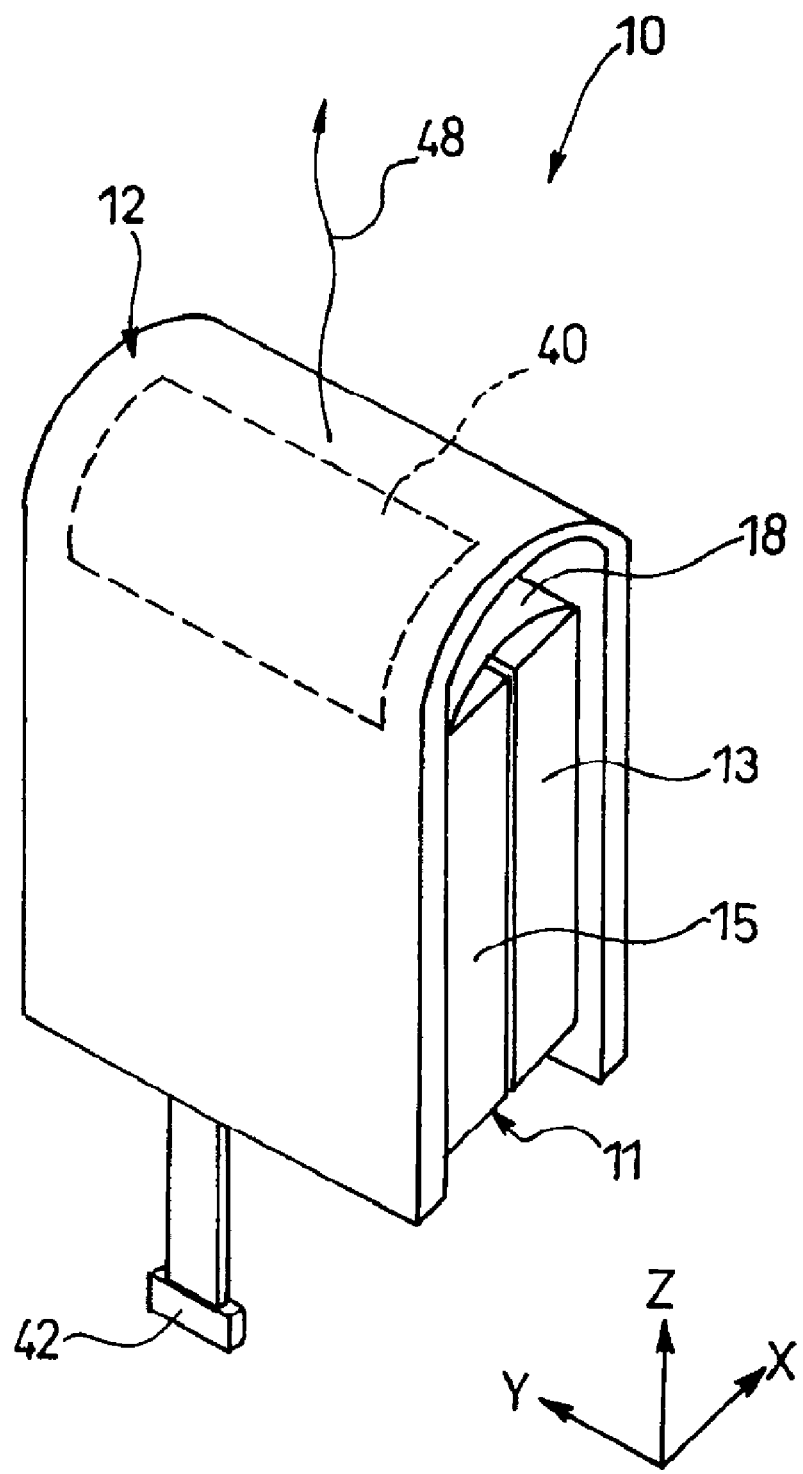
FIG. 4 is a perspective view in which the mobile terminal apparatus is closed according to the first embodiment of the invention.
Figure 5:
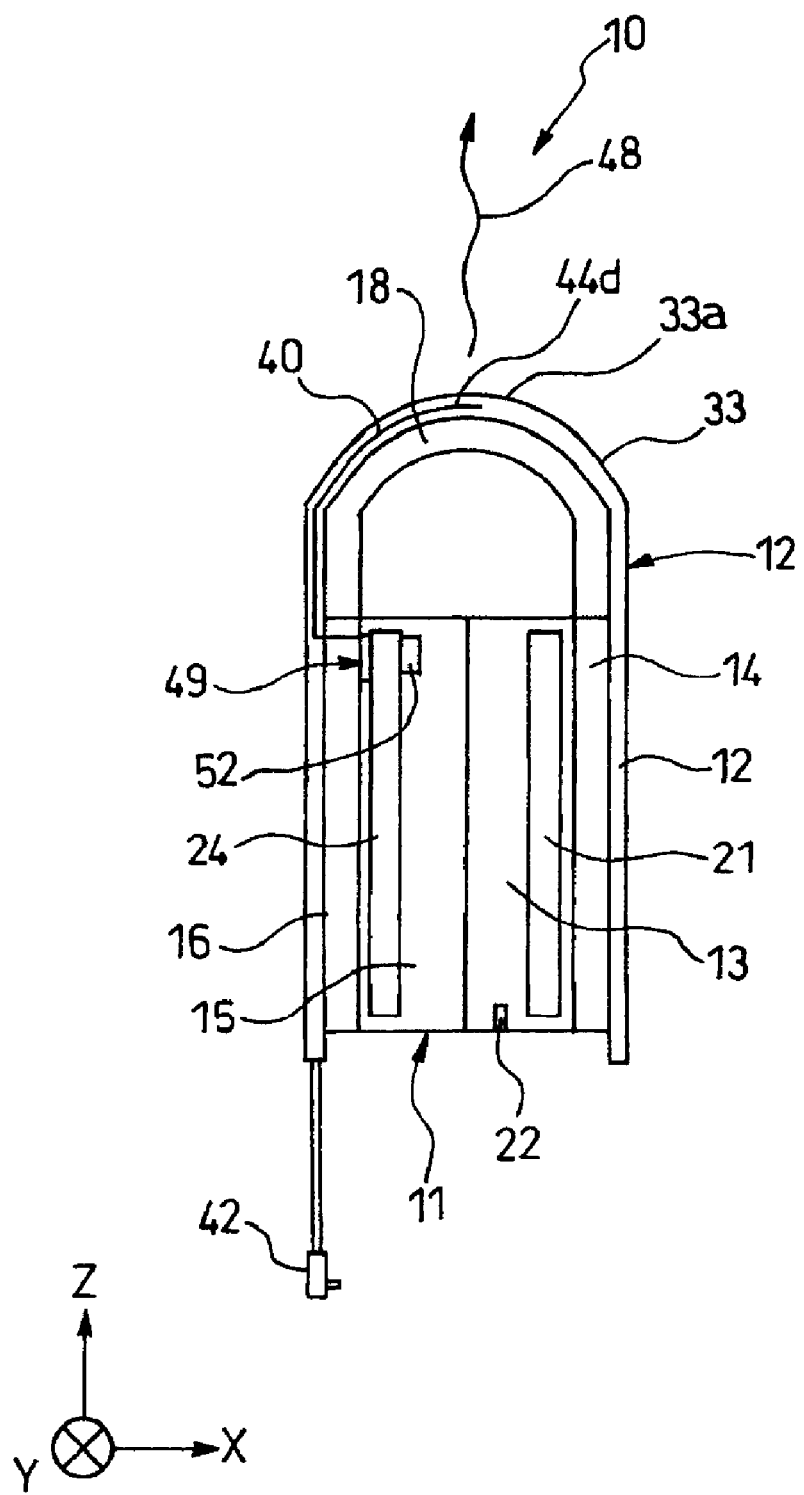
FIG. 5 is a sectional view in which the mobile terminal apparatus is closed according to the first embodiment of the invention.

As shown in FIGS. 4 and 5, the joint sheet metal 26 is elastically deformed substantially in a U shape when the upper and lower housing 13 and 15 are closed. A force for opening the upper and lower housing 13 and 15 acts by a resilient force of the elastically deformed joint sheet metal 26.

When the joint sheet metal 26 is deviated from a center of the width direction of the coupling part 18, the resilient force of the joint sheet metal 26 acts only on one side (for example, only on a right side) of the first and second housing at the time of closing the first and second housing, whereby a torsion force occurs in the upper and lower housing 13 and 15.

As the result, when the upper and lower housing 13 and 15 are opened, one side of the upper and lower housing 13 and 15 is opened earlier, that is, a one-side opening phenomenon occurs.

Therefore, the joint sheet metal 26 is disposed in the center of the width direction of the coupling part 18. Accordingly, as shown in FIGS. 4 and 5, when the upper and lower housing 13 and 15 are closed, the resilient force of the joint sheet metal 26 acts on the center of the width direction of the upper and lower housing 13 and 15.

Accordingly, since the upper and lower housing 13 and 15 can be evenly opened so that the one-side opening phenomenon does not occur at the time of opening the upper and lower housing 13 and 15, it is possible to improve ease of use.

As shown in FIG. 3, the lower end portion 44a of the antenna part 40 faces an upper end portion of the lower housing case 16, whereby the upper end portion 44d of the antenna part 40 is disposed in a top portion 33a of the flexible part 33.

The upper end portion 44d of the antenna part 40 is disposed on the top portion 33a of the flexible part 33, whereby it becomes possible to dispose the upper end portion 44a of the antenna part 40 at a position farthest away from the joint sheet metal 26 or the upper and lower circuit boards 21 and 24 at the time of closing or opening the protective cover 12.

Accordingly, the upper end portion 44d of the antenna part 40 can be apart from the grounds 28 of the joint sheet metal 26 or grounds (not shown) of the upper and lower circuit boards 21 and 24, so that it is possible to supply high antenna performance by keeping resistance factors away from a radio wave 48 (see FIG. 3) emitted from the upper end portion 44d of the antenna part 40.

In particular, as shown in FIGS. 4 and 5, it becomes possible to efficiently dispose the upper end portion 44d of the antenna part 40 apart from the grounds of the upper and lower circuit boards 21 and 24 at the time of closing the protective cover.

Here, a reason why the antenna part 40 is provided in the flexible part 33 is described in detail.

An X-Z plane PAG (dBd) is measured at a frequency of 810 MHz as a measurement condition.

In a state in which the antenna part 40 is provided in the joint sheet metal 26 and the upper and lower housing 13 and 15 are opened, a measurement value of the X-Z plane PAG is −10.9 (dBd).

In a state in which the antenna part 40 is provided in the flexible part 33 and the upper and lower housing 13 and 15 are opened, a measurement value of the X-Z plane PAG is −5.1 (dBd).

Assuming that the antenna part 40 is provided in the flexible part 33, the measurement value of the X-Z plane PAG is improved by 5.8 (dBd), it is possible to know that an excellent antenna characteristic is excellent.

In the antenna part 40, the conductor 45 is electrically connected to a power feeding terminal (a leading edge) 49, which is formed of a magnetic substance.

The power feeding terminal 49 is electrically connected to the lower circuit board 24 by contacting the power feeding terminal 49 with an antenna power feeding land 51 (see FIGS. 1 and 3).

In the lower circuit board 24, a magnet 52 is provided on a back surface 24a of the antenna power feeding land 51.

The magnet 52 has a size of 5 mm long, 5 mm wide, and 1 mm thick and a magnetic force of 1200 gauss as an example.

Even though the antenna power feeding land 49 of the lower circuit board 24 is deviated from the power feeding terminal 49 of the antenna part 40 at the time of removing the protective cover 12, the deviation is corrected by the magnetic force of the magnet 52 by attracting the power feeding terminal 49 with the magnet 52, whereby it is possible to perform stable power feeding.

Here, an antenna characteristic when the magnet 52 is not provided in the lower circuit board 24 (referred to as "there is no a magnet") and an antenna characteristic when the magnet 52 is provided in the lower circuit board 24 (referred to as "with magnet") are described.

An X-Z plane PAG (dBd) is measured at the frequency of 810 MHz as a measurement condition.

Measurement values of the X-Z plane PAG measured in a state that the upper and lower housing 13 and 15 are opened are follows.

The measurement value of the X-Z plane PAG of "without magnet" is −5.1 (dBd).

The measurement value of the X-Z plane PAG of "with magnet" is −5.0 (dBd).

A difference between the measurement values of the X-Z plane PAG when "without magnet" and when "with magnet" is +0.1 (dBd) and the both measurement values have little difference.

Next, a measurement value of the X-Z plane PAG is described when the upper and lower housing 13 and 15 are closed.

When "without magnet", the measurement value of the X-Z plane PAG is −8.4 (dBd).

When "with magnet", the measurement value of the X-Z plane PAG is −8.5 (dBd).

A difference between the measurement values of the X-Z plane PAG when "without magnet" and when "with magnet" is −0.1 (dBd) and the both measurement values have little difference.

In other words, it is possible to know that the antenna characteristics by present or absence of the magnet 52 have little difference.

Therefore, even though the magnet 52 is provided in the lower circuit board 24, there is no possibility for giving a harmful effect on the antenna characteristic of the antenna part 40.

Second Embodiment

Figure 7:
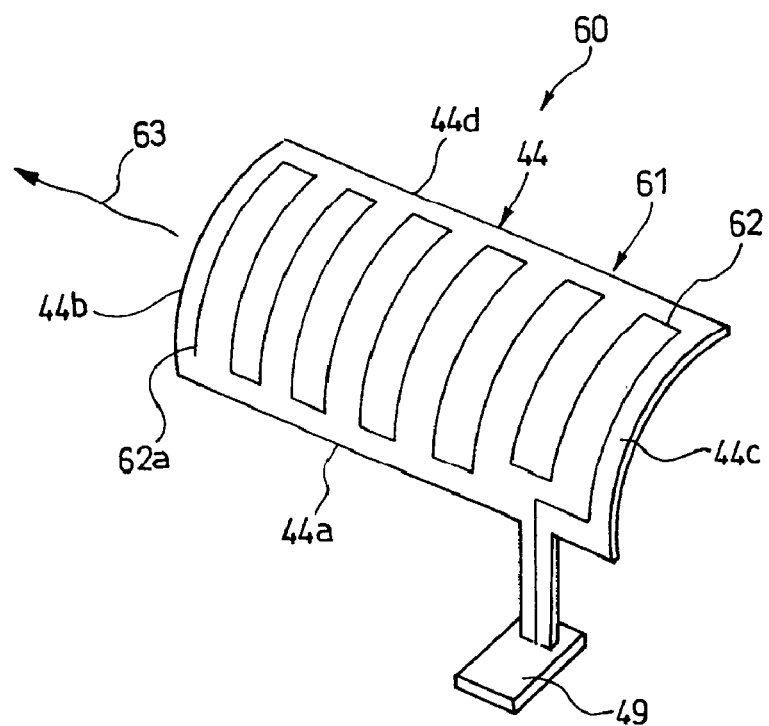
FIG. 7 is a perspective view illustrating an antenna part of a mobile terminal apparatus (a second embodiment) according to an embodiment of the invention.
Figure 8:
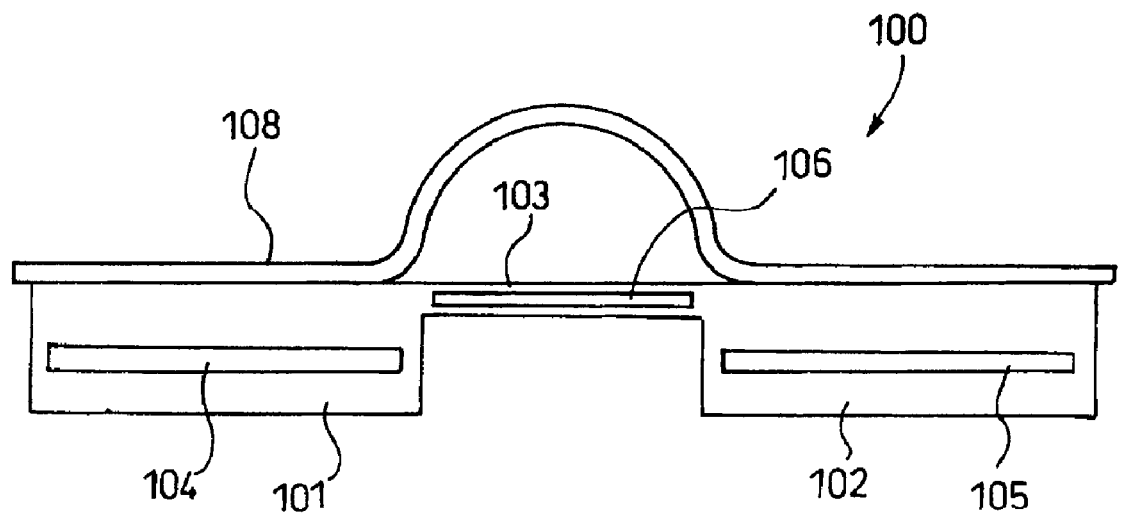
FIG. 8($a$) is a side view illustrating a state in which a conventional folding-type mobile terminal apparatus is opened and FIG. 8($b$) is a side view illustrating a state in which the conventional folding-type mobile terminal apparatus is closed.
Figure 8:
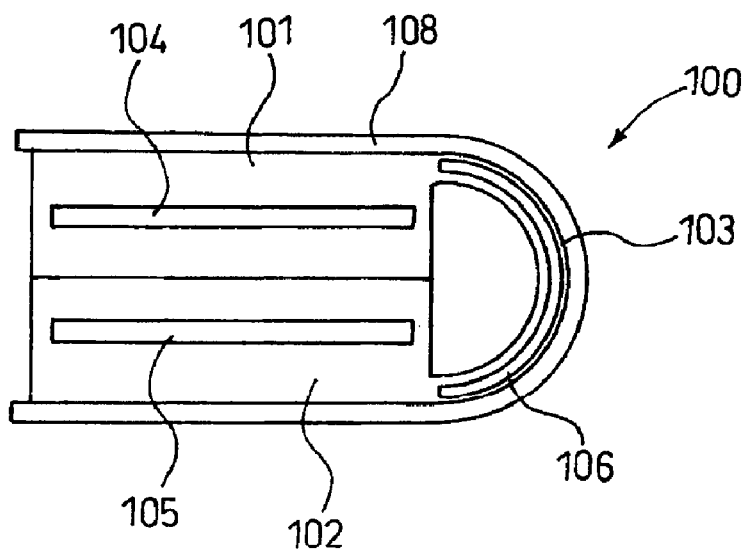

In a protective cover 60 of a second embodiment shown in FIG. 7, an antenna part 61 takes place of the antenna part 40 of the first embodiment and other constituent members are the same as those of the first embodiment.

Hereinafter, in the antenna part 61 of the second embodiment, a member equal to or similar to the antenna part 40 of the first embodiment is denoted by the same reference numeral and sign and a description thereof will be omitted.

In the antenna part 61, a rectangular flexible plate 44 has a curved shape, a conductor 62 extends along one end portion 44c in a width direction of the plate 44, the upper and low end portions 44d and 44a of the plate 44 are folded in a bellows shape toward the other upper end portion 44b, so that an end edge 62a of the conductor 62 is disposed on the end portion 44b of the plate 44.

The end edge 62a of the conductor 62 is disposed on the end portion 44b, whereby a radio wave 63 is transmitted from the end portion 44b of the plate 44.

Even in the antenna part 61 of the second embodiment, it is possible to obtain the same effect as the antenna part 40 of the first embodiment.

In the above-mentioned embodiment, the protective cover 12 which is removably mounted on the mobile terminal apparatus body 11 is exemplified as the mobile terminal apparatus, but is not limited to it and a protective cover which is integral with the mobile terminal apparatus body 11 may be used as the mobile terminal apparatus.

In the above-mentioned embodiment, a case in which paper shields 38 and 39 are used as low dielectric substances having the antenna part interposed therebetween is described, but is not limited to it and it is possible to obtain the same effect as long as the members have a low dielectricity.

In the above-mentioned description, although the case in which the antenna part is interposed between the front-side and back-side shields 38 and 39 has been described, it is not limited to such construction and any one of the front-side and back-side shields 39 and 39 may be used.

Here, when any one of the front-side and back-side shields 38 and 39 is used, it is preferable to use the front-side shield 38. User's hands and the antenna part 40 can be shielded to the front-side shield 38 at the time of using the mobile terminal apparatus 10 by using the front-side shield 38.

Accordingly, it is possible to obtain the excellent antenna characteristic by suppressing a harmful effect given to the antenna part 40 by the user's hands.

The invention is not limited to the above-mentioned embodiments. Various modifications may occur insofar as the scope of the invention.

The application related to subject matter related to Japanese Patent Application (JP 2005-014113), the entire contents of which being incorporated herein by reference.

INDUSTRIAL APPLICABILITY

The present invention is suitable for a mobile terminal apparatus having a first housing and a second housing coupled with each other by a coupling part so as to be openable and closable, circuit boards provided in the first and second housing, and protective covers protecting the members.

The invention claimed is:

1. A mobile terminal apparatus comprising:
a first housing and a second housing coupled with each other by a coupling part so as to be openable and closable;
a first circuit board and second circuit board provided in the first housing and the second housing, respectively;
a first protective cover part and a second protective cover part covering the first housing and the second housing, respectively; and
a flexible part coupling the first protective cover part and the second protective cover part so as to be openable and closable and covering the coupling part,
wherein, an antenna power feeding land is provided in one of the first circuit board and the second circuit board, a leading edge of an antenna part is electrically connected to said one circuit board via the antenna power feeding land, and the antenna part is housed in the flexible part, and
wherein a magnet is provided on a surface opposite to the antenna power feeding land and a leading edge of the antenna part is contacted with the antenna power feeding land by attracting the leading edge of the antenna part with the magnet.

2. The mobile terminal apparatus according to claim 1, wherein the coupling part is discrete from the flexible part.

3. A mobile terminal apparatus comprising:
a first housing and a second housing coupled with each other by a coupling part so as to be openable and closable;
a first circuit board and second circuit board provided in the first housing and the second housing, respectively;
a first protective cover part and a second protective cover part covering the first housing and the second housing, respectively; and
a flexible part coupling the first protective cover part and the second protective cover part so as to be openable and closable and covering the coupling part,
wherein, an antenna power feeding land is provided in one of the first circuit board and the second circuit board, a leading edge of an antenna part is electrically connected to said one circuit board via the antenna power feeding land, and the antenna part is housed in the flexible part, and
wherein a joint sheet metal electrically connecting the first circuit board and the second circuit board is disposed in a center of the coupling part.

4. The mobile terminal apparatus according to claim 3, wherein the coupling part is discrete from the flexible part.

5. A mobile terminal apparatus comprising:
a first housing and a second housing coupled with each other by a coupling part so as to be openable and closable;
a first circuit board and second circuit board provided in the first housing and the second housing, respectively;
a first protective cover part and a second protective cover part covering the first housing and the second housing, respectively;
a flexible part coupling the first protective cover part and the second protective cover part so as to be openable and closable and covering the coupling part,
an antenna part; and
an antenna power feeding land,
wherein, the antenna power feeding land is provided in one of the first circuit board and the second circuit board, a leading edge of the antenna part is electrically connected to said one circuit board via the antenna power feeding land, and the antenna part is housed in the flexible part, wherein the flexible part includes a front-side bending portion and a back-side bending portion and further includes a front-side antenna shield and a back-side antenna shield disposed between the front-side bending portion and the back-side bending portion.

6. The mobile terminal apparatus according to claim 5, wherein the antenna part is disposed between the front-side antenna shield and the back-side antenna shield.

* * * * *

UNITED STATES PATENT AND TRADEMARK OFFICE
CERTIFICATE OF CORRECTION

PATENT NO.         : 7,840,243 B2                                          Page 1 of 1
APPLICATION NO.    : 11/814482
DATED              : November 23, 2010
INVENTOR(S)        : Masayoshi Hirai It is certified that error appears in the above-identified patent and that said Letters Patent is hereby corrected as shown below:

Title Page,
Item 54
"ANTENNA ARRANGEMENT IN A MOBILE TERMINAL APPARATUS" should read,
--ANTENNA ARRANGEMENT IN A MOBILE TERMINAL--.

Title Page,
Item 22
"PCT Filed: Jan. 26, 2006" should read, --PCT Filed: Jan. 20, 2006--.

Column 10, Line 62
"closable and covering the coupling part," should read, --closable and covering the coupling part;--.

Signed and Sealed this
Eighth Day of February, 2011

David J. Kappos
*Director of the United States Patent and Trademark Office*

UNITED STATES PATENT AND TRADEMARK OFFICE
CERTIFICATE OF CORRECTION

PATENT NO. : 7,840,243 B2  
APPLICATION NO. : 11/814482  
DATED : November 23, 2010  
INVENTOR(S) : Masayoshi Hirai Page 1 of 1

It is certified that error appears in the above-identified patent and that said Letters Patent is hereby corrected as shown below:

Title Page, Item (54) and at Column 1, lines 1 and 2, title,

"ANTENNA ARRANGEMENT IN A MOBILE TERMINAL APPARATUS" should read, --ANTENNA ARRANGEMENT IN A MOBILE TERMINAL--.

Title Page,
Item 22
"PCT Filed: Jan. 26, 2006" should read, --PCT Filed: Jan. 20, 2006--.

Column 10, Line 62
"closable and covering the coupling part," should read, --closable and covering the coupling part;--.

This certificate supersedes the Certificate of Correction issued February 8, 2011.

Signed and Sealed this
Fifteenth Day of March, 2011

David J. Kappos
*Director of the United States Patent and Trademark Office*